Feb. 14, 1961 L. G. SIMJIAN 2,971,303
METHOD AND APPARATUS FOR COMPARTMENTIZING
AND STORING AN ARTICLE
Filed Dec. 22, 1958 4 Sheets-Sheet 2
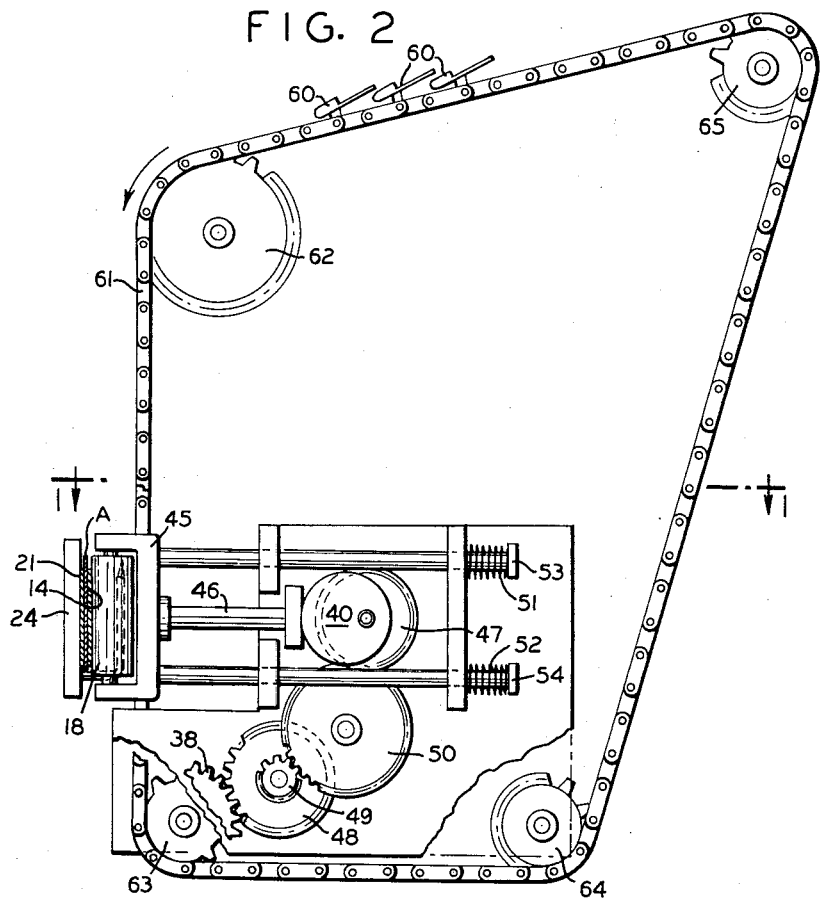
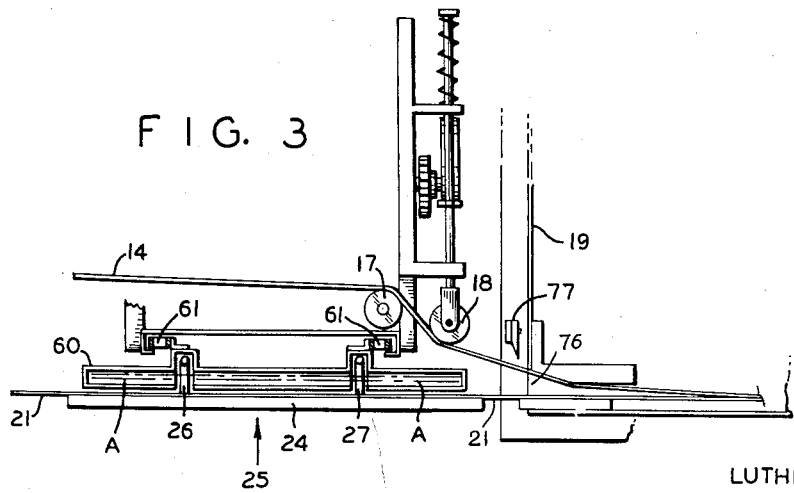
INVENTOR.
LUTHER G. SIMJIAN
BY
Ervin B. Steinberg
AGENT.

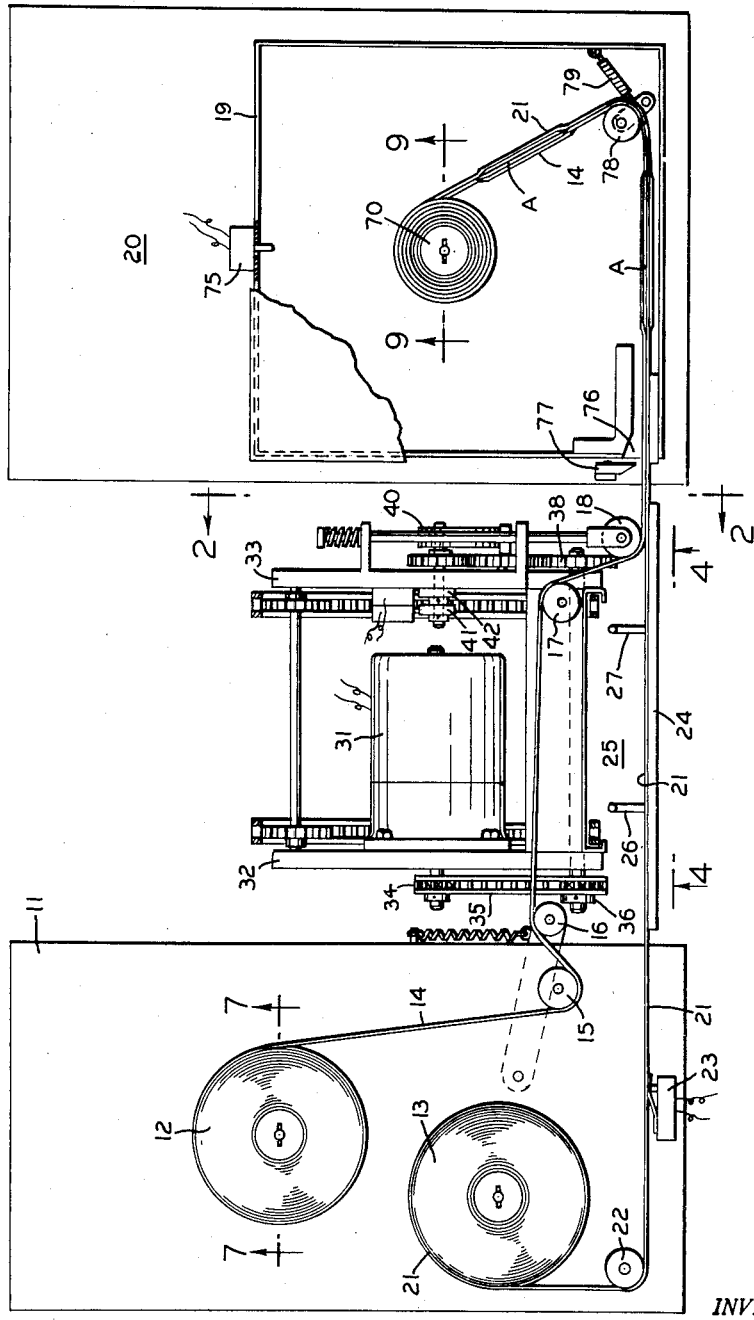
Feb. 14, 1961 — L. G. SIMJIAN — 2,971,303
METHOD AND APPARATUS FOR COMPARTMENTIZING AND STORING AN ARTICLE
Filed Dec. 22, 1958 — 4 Sheets-Sheet 1
INVENTOR.
LUTHER G. SIMJIAN
BY
Ervin B. Steinberg
AGENT.

Feb. 14, 1961     L. G. SIMJIAN     2,971,303
METHOD AND APPARATUS FOR COMPARTMENTIZING
AND STORING AN ARTICLE
Filed Dec. 22, 1958     4 Sheets-Sheet 3
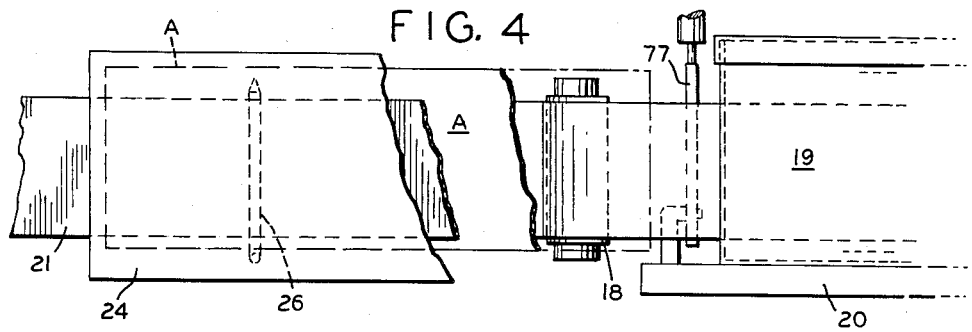
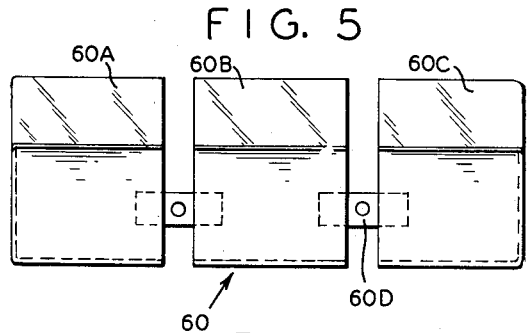
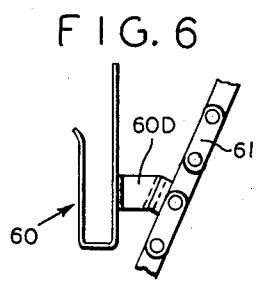
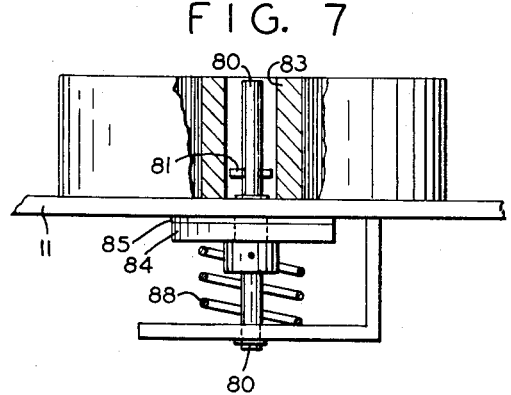
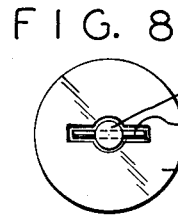
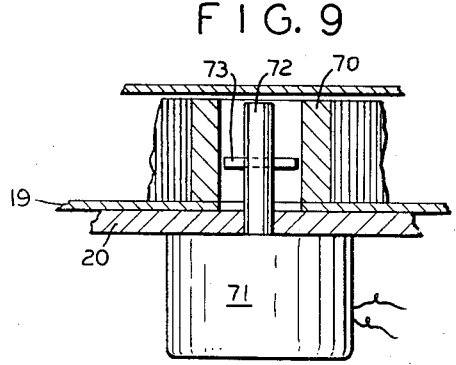
INVENTOR.
LUTHER G. SIMJIAN
BY
Ervin B. Steinberg
AGENT.

Feb. 14, 1961 L. G. SIMJIAN 2,971,303
METHOD AND APPARATUS FOR COMPARTMENTIZING
AND STORING AN ARTICLE
Filed Dec. 22, 1958 4 Sheets-Sheet 4

INVENTOR.
LUTHER G. SIMJIAN
BY
Ervin B. Steinberg
AGENT.

United States Patent Office 2,971,303
Patented Feb. 14, 1961

2,971,303
METHOD AND APPARATUS FOR COMPARTMENTIZING AND STORING AN ARTICLE
Luther G. Simjian, Laurel Lane, Greenwich, Conn.
Filed Dec. 22, 1958, Ser. No. 782,177
13 Claims. (Cl. 53—28)

This invention in general refers to a method and apparatus for compartmentizing and storing for deposit an article, and more specifically has reference to a method and means for compartmentizing and storing a single or a plurality of articles within flexible strip material.

This invention is related also to an improved method for compartmentizing a plurality of individual articles to effect a unitary deposit as disclosed in my copending application for U.S. Letters Patent Serial No. 693,986 entitled "Depository Machine Combined With Camera Means," filed November 1, 1957.

In connection with depository devices of the type disclosed in the application referenced, it is necessary not only to provide means for receiving one or more individual articles but also to store these articles for deposit in a distinct and separate manner from a succeeding deposit. Although this task may be accomplished for instance by the use of a compartmentized receptacle into which the single article or a plurality of articles is inserted, I have found that great simplification can be achieved by providing covering material in the form of a strip or in other suitable shape to effect compartmentization.

One of the objects of this invention is therefore the provision of an improved method and apparatus for compartmentizing and storing an article.

Another object of this invention is the provision of an improved method and apparatus for compartmentizing and storing a plurality of individual articles.

Another object of this invention is the provision of a method and apparatus for compartmentizing a plurality of stacked articles.

A further object of this invention is the provision of an apparatus for compartmentizing a plurality of individual articles which form a unitary deposit and to retain this deposit in a separate and distinct manner from a succeeding deposit.

Another and further object of this invention is the provision of strip material for effecting compartmentization of a plurality of stacked articles.

Another and still further object of this invention is the provision of an improved method and apparatus for effecting compartmentization and storing of unitary deposits within a rather simple and inexpensive storage receptacle.

Further and still other objects of this invention will be apparent by reference to the following specification taken in conjunction with the accompanying drawings in which:

Figure 1 is a plan view, partly in section, along lines 1—1 of Figure 2;

Figure 2 is an elevational view, partly in section, along lines 2—2 of Figure 1;

Figure 3 is a plan view showing in an enlarged scale certain portions appearing in Figure 1;

Figure 4 is an elevational view, partly in section, of certain details as viewed along lines 4—4 in Figure 1;

Figure 5 is a close-up view of an article supporting means visible in Figure 2;

Figure 6 is a side view of the article supporting means shown in Figure 5;

Figure 7 is an elevational view, partly in section, along lines 7—7 of Figure 1;

Figure 8 is a top view of Figure 7;

Figure 9 is an elevational view, partly in section, along lines 9—9 of Figure 1;

Figure 10:
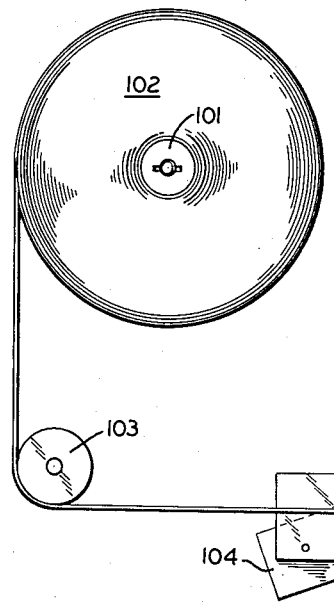
Figure 10 is a plan view of an alternate arrangement for providing strip material.

Referring now to the figures and Figure 1 in particular, numeral 11 identifies a base plate on which there is supported a pair of rolls of strip material, numerals 12 and 13. This strip material may comprise flexible paper tape, banding material, filament tape, ribbon material, wire, or other suitable material which is adapted to partially or wholly cover articles and which is adapted to retain and compartmentize a single or a plurality of articles. Tape 14 being unwound from roll 12 is fed about a fixed roller 15, a resiliently biased roller 16, over a fixed roller 17, and in contact with a reciprocating roller 18 to a storage receptacle 19, the latter being mounted on a support plate 20. Tape 21, being unwound from the roll of tape 13, is fed over a fixed roller 22 along an electrical sensing switch 23, along the inner face of a pressure plate 24 to storage receptacle 19.

It will be observed that tapes 14 and 21 are spaced from one another at an area opposite the pressure plate 24 and this area, numeral 25, will be referred to hereinafter as an article insertion station, as will be more clearly understood during the ensuing description.

Pressure plate 24 is equipped on its side with a set of protruding L-shaped brackets, numerals 26 and 27, which are made preferably of round bar stock and which are used as pick-off fingers since they are adapted to pick articles from article supporting means and retain the articles in stacked relation prior to the articles becoming compartmentized by portions of tapes 14 and 21 respectively. The horizontal portions of the L-shaped fingers are disposed below the lower edge of strip material 21.

Motor 31, mounted in a suitable frame structure which comprises in part side plates 32 and 33, drives a gear 34 which via chain 35 drives another gear 36. Gear 36 is mounted on a common transverse shaft with gear 38, the latter driving by way of intermediate gearing, seen more clearly in Figure 2, a cam 40 and a set of timing cams 41 and 42.

When motor 31 runs through a cycle of operation, cam 40 (Figure 2) is rotated so as to cause reciprocatory motion of roller 18. This roller is supported within a U-shaped bracket 45 from which there extends a central push rod 46, the latter being in engagement with and driven by eccentric cam 40, this cam being mounted on a common shaft with gear 47 and the latter receiving its rotation from gear 38 via a set of intermediate gears, numerals 48, 49 and 50. Helical compression springs 51 and 52 engage guide rods 53 and 54 respectively and apply a bias to bracket 45 so as to hold the roller in its retracted position, that is away from pressure plate 24.

Articles to be compartmentized and stored are inserted in a set of pockets 60 which are mounted in nested fashion, as indicated in Figure 2, between a set of laterally spaced endless chains 61 along a portion of the chain loop. The chains, only one is visible in Figure 2, being driven in unison by motor 31 about a set of sprockets 62, 63, 64, and 65.

Each pocket, as shown more clearly in Figures 5 and 6, comprises three U-folded portions, numerals 60A, 60B, and 60C. The individual pocket sections are held to one another by suitable brackets 60D, the latter brackets being formed also in a manner to fasten the pockets to the chains, see Figure 6. In its overall appearance each pocket forms a U-shaped support means which is adapted to receive an article to be deposited, for instance, a money bill, which will be inserted into the pocket in an upstanding fashion.

During each cycle of operation the pockets 60 mounted on chains 61 are rotated one complete revolution whereby the pockets traverse in vertical direction (counter-clockwise as indicated by the arrow in Figure 2) the article insertion station 25, Figure 1. The pick-off fingers 26 and 27 are so disposed that they come to be positioned within the space between pocket portions 60A and 60B, and 60B and 60C respectively, yet lie in front of brackets 60D. In this manner when pockets 60 pass the pressure plate 24, individual articles inserted in pockets 60 are removed sequentially from the pockets, thereby causing a plurality of articles distributed among the several pockets to be collected, stacked, and retained at this station.

As each pocket passes through the station, each removed article becomes aligned in brackets 26 and 27 and is placed in stacked relation with respect to the article removed from the preceding pocket.

The passing of pockets 60 through the article insertion station 25 is seen more clearly in Figure 3 wherein pocket 60 carrying an article A is shown as being disposed opposite pressure plate 24. It will be observed that at the time that pockets 60 pass through the article insertion station, roller 18 is retracted so as to permit unimpeded movement of the pockets. Slack of strip material 14, caused by rearward motion of roller 18, is taken up by resiliently biased roller 16 (Figure 1). When pockets 60 have moved through the article insertion station, all articles formerly contained in pockets 60 are disposed in stacked relation and are placed furthermore, between strip 21 in front and strip 14 located toward the rear. A brief moment thereafter, while motor 31 is still running, roller 18 is driven forward by virtue of its engagement with cam 40, carrying with it strip 14, thereby causing clamping pressure to be exerted at the leading edge of articles A. The articles thus are frictionally retained between strips 21 and 14. Next cam 41 energizes its associated microswitch (Figure 1) to cause the so retained articles to be advanced toward the receptacle 19, thus effecting compartmentization of the articles between the strips and winding of the articles and strips about a roller 70.

Roller 70, see Figure 9, is driven from a motor 71 via shaft 72 fitted with a transverse pin 73 which engages vertical slots in roller 70. In this manner positive coupling is achieved between motor 71 and roller 70 contained within storage receptacle 19. When receptacle 19 is full, as sensed by switch 75 (Figure 1), it is lifted off plate 20 and thus uncoupled from shaft 72. It will be apparent to those skilled in the art that the receptacle is constructed with a removable top lid so as to enable authorized personnel to gain access to the stored and compartmentized material wound about roller 70. As the strips 14 and 21, retaining compartmentized articles A therebetween, enter aperture 76 of receptacle 19, they pass a knife 77 which is used to sever the strip material, particularly when removal of the storage receptacle and its contents from the apparatus is desired. The receptacle is equipped on its inside with a resiliently biased tension roller 78 about which the strip material and the compartmentized articles are wound. As soon as the strips are severed, roller 78 by means of spring 79 causes the free end of the strip material to be drawn into the inside of the receptacle thus rendering the strips and their contents inaccessible to the deposit collecting personnel. The filled receptacle then is moved off shaft 71 and delivered to the collecting establishment.

Figure 4 shows in detail the arrangement of the strips and articles at plate 24. Going from front to rear on the left side there is plate 24, strip material 21, articles A and pick-off finger 26. Toward the right there is visible roller 18, knife 77, and storage receptacle 19.

The unwinding of rolls 12 and 13 is prevented by friction means more clearly illustrated in Figures 7 and 8.

Each roll is mounted on a shaft 80 equipped with a transverse pin 81 which engages a vertical slot in bushing 83. Shaft 80 is provided also with a flange 84 having at one side thereof a friction pad 85, for instance felt, which engages plate 11. Spring 88 provides engagement pressure between friction pad 85 and the underside of plate 11. When strip material is unwound from roll 12 or 13 by operation of motor 71, the engagement between friction pad 85 and plate 11 tends to keep strips 14 and 21 taut.

Although the operation of the various elements has been indicated heretofore in connection with the identification of the various components, it will be advantageous to review the operation of the various elements and their coaction for one complete operating cycle.

When the machine is at rest, the pockets are in the position as indicated in Figure 2 and roller 18 is retracted as shown in Figure 3. A depositor desiring to operate the machine inserts articles such as money bills into pockets 60. When the machine is started by suitable control means, motor 31 is energized, causing rotation of gears 34, 36, 63, 38, 48, 49, 50 and 47. This causes the chains 61 to rotate about sprockets 62, 63, 64, and 65 thereby providing motion of the pockets 60 past the article insertion station. As the pockets move past the article insertion station, pick-off fingers 26 and 27 collect and retain in stacked relationship the individual articles A formerly disposed in pockets 60. When the pockets have left the article insertion station, eccentric cam 40, driven by gear 47, advances roller 18 toward the forward position as shown in Figure 1, thereby clamping the articles between strips 21 and 14. A brief moment thereafter, cam 41, also driven by motor 31, causes closing of the associated circuit switch which in turn energizes motor 71 to pull the stacked articles confined between the two sets of strips into receptacle 19. As the articles pass roller 18 they become fully compartmentized.

When the articles have been removed into the storage receptacle, eccentric cam 40 permits roller 18 to again resume its retracted position as shown in Figure 3, pockets 60 will have resumed their location as shown in Figure 2, and switch 23 engaging strip 21 causes shutdown of motor 31. Switch 23 senses properly spaced perforations in strip 21 in order to effect always the same amount of material to pass the insertion station before shutdown occurs. It will be apparent that other measuring means may be used for timing purposes, such as photoelectric cells sensing perforations through which a light shines or photoelectric cells sensing spaced markings on the strips. Alternately, a measuring roller in contact with the strip material and driving a cam which in turn actuates a switch may be employed. By suitably adjusting the amount of strip material to be dispensed for each operating cycle, the apparatus may regulated in such a manner that the individual deposits are properly spaced from one another as indicated in Figure 1, wherein there is a distinct amount of spacing between succeeding deposits. In this manner a plurality of individual articles can be collected for deposit and stored as a unitary deposit which is distinct from a succeeding and similar deposit.

Cam 42 also driven by motor 31, is a timing cam to effect operation for one cycle upon starting motor 31.

Obviously, suitably burglar protection may be incorporated to prevent unauthorized removal of the storage receptacle containing deposits from the apparatus. Moreover, proper locking means may be employed to fasten the top cover to the receptacle for safeguarding the deposits and to assure that the top cover will be opened only at the collection establishment and not in transit.

Figure 11:
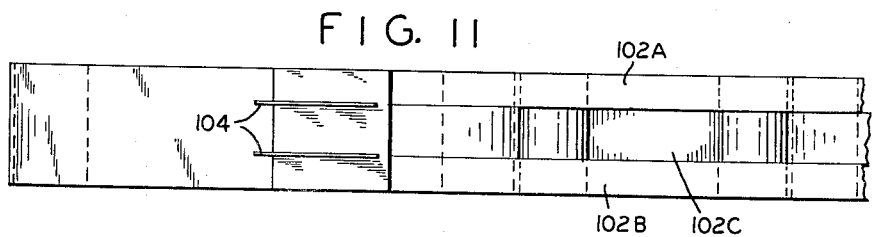
Figure 11 is a plan view of the strip material obtained by the means shown in Figure 10.
Figure 12:
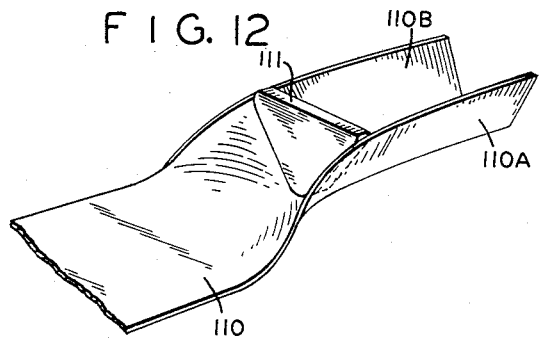
Figure 12 is a perspective view, illustrating another method for providing suitable strip material.

Figures 10, 11 and 12 show variations in the arrangement for compartmentizing articles. Whereas in the preceding illustrations a pair of strips is used, one strip in front and one strip in the rear of the articles, Figures 10 and 11 show an alternate arrangement wherein a single strip is cut into three lengthwise portions. Numeral 101 refers to a spool on which there is mounted a roll of paper tape 102. The tape is fed about a roller 103 and then to a pair of slitting knives 104 which are mounted between suitable brackets 105. From there the tape is fed to a roller 106 and the upper and lower tape portions 102A and 102B remain in front whereas the middle portion 102C is fed about rollers 107, 108 and 109 thus occupying the location of tape 14 of Figure 1. In this manner a set of three strip materials is employed using only a single roll of supply.

Figure 12 shows still another solution wherein a strip or length of tape material 110 is fed about a forming die 111 to produce two upstanding portions of tape 110A and 110B. These two portions forming a V may now be severed by means of a slitting knife to provide two separate tapes or, by means of collecting means disclosed in my aforementioned application for Letters Patent, articles may be dropped into the V-shaped material to partially or wholly enclose the articles followed by transfer of this package to the storage receptacle 19.

It is apparent that the instant arrangement readily and very simply provides a method and means for compartmentizing an article or compartmentizing a plurality of stacked articles. In this manner deposits are stored separately and distinctly from each succeeding deposit without the necessity of pre-constructed pockets or compartmentized containers. The overall result is a considerable simplification of the apparatus and reduction in complexity of article insertion means. The storage receptacle itself is free of complex and intricate parts. Unloading of the receptacle is accomplished readily by removing the top cover, feeding the severed ends through the aperture and then unwinding the tapes which retain stacked articles, deposit by deposit. Obviously, a mechanism similar to unwinding film reels may be employed to accomplish the emptying of the receptacle.

If desired, marking means may be arranged in the apparatus to provide tapes 14 or 21 with indicia before they enter the receptacle. The indicia may constitute serial numbers, dates, codes, etc. as applicable.

It shall be understood further that without deviating from the principles disclosed the dispensing of strips, wire, or ribbon may be replaced by pre-cut or pre-folded and cut covering material. The latter material may be dispensed from a hopper to the article insertion station in order to produce the compartmentized deposit described hereinbefore.

While there have been described certain embodiments of the present invention, it will be apparent to those skilled in the art that various other modifications and changes may be incorporated without deviating from the spirit and intent of the present invention which shall be limited only by the scope of the appended claims.

What is claimed is:

1. Apparatus for compartmentizing and storing a plurality of individual articles in the form of a unitary deposit comprising: an article insertion station; material conveying means cyclically conveying a set of strips past said article insertion station; means causing said strips to be cyclically spaced from one another at said station to receive articles therebetween; article carrying means carrying individual articles successively to said article insertion station; means disposed at said station for removing successively each of the articles from the article carrying means and bringing the individual articles into stacked relation at said insertion station; means closing the space between a portion of said strips when said articles are in stacked relation thereby causing said articles to become retained between said strips, and means cyclically actuated for moving said stacked and compartmentized articles into a storage receptacle.

2. Apparatus for compartmentizing and storing a plurality of individual articles in the form of a unitary deposit comprising: an article insertion station; material conveying means cyclically conveying a set of strips past said article insertion station; means causing said strips to be cyclically spaced from one another at said station to receive articles therebetween; article carrying means cyclically carrying individual articles successively to said article insertion station; means disposed at said station for removing successively each of the articles from the article carrying means and bringing the individual articles into stacked relation at said insertion station while said article carrying means move between said strips; means closing the space between a portion of said strips when said articles are in stacked relation thereby causing said articles to become retained between said strips, and means cyclically actuated moving said stacked and compartmentized articles from said article insertion station.

3. Apparatus for compartmentizing and storing an article for deposit comprising: an article insertion station; material conveying means conveying a pair of strips past said article insertion station; reciprocating guide means disposed at said station and engaging one of said strips; means actuating the guide means to cyclically move the engaged strip toward and away from the other strip thereby cyclically opening and closing a gap between said strips; article carrying means disposed to move along an axis crosswise to the direction of the movement of the strips past said insertion station; said article carrying means adapted to bring the article to be compartmentized and stored to the insertion station when the reciprocating guide means is moved to a position at which there exists said gap; means disposed at said station to remove the article from the article carrying means and temporarily retain the article at said station; means causing the guide means to close the gap thereby causing a portion of the article to become retained by said strips, and means advancing said pair of strips while the guide means maintains the gap closed thereby retaining and compartmentizing article between said strips.

4. Apparatus for compartmentizing and storing an article for deposit comprising: an article insertion station; material conveying means conveying a pair of strips disposed substantially parallel to one another past said article insertion station; guide means mounted for reciprocatory motion disposed at said station and engaging one of said strips; means actuating the guide means to cyclically move the engaged strip toward and away from the other strip thereby cyclically opening and closing a gap between said strips; article carrying means disposed to move along an axis crosswise to the direction of the movement of the strips past said insertion station; said article carrying means adapted to bring the article to be compartmentized and stored to the insertion station when the reciprocating guide means is moved to a position at which there exists said gap; means disposed at said station to remove the article from the article carrying means and temporarily retain the article at said station; means causing the guide means to close the gap thereby causing a portion of the article to become retained by said strips, and means advancing said pair of strips while the guide means maintains the gap closed thereby retaining and compartmentizing the article between said strips and moving the article from the insertion station.

5. Apparatus for compartmentizing and storing an article for deposit comprising: an article insertion station; material conveying means conveying a pair of strips disposed substantially parallel to one another past said article insertion station; guide means mounted for reciprocatory motion disposed at said station and engaging one of said strips; means actuating the guide means to cyclically move the engaged strip toward and away from the other strip thereby cyclically opening and closing a gap between said strips; article carrying means disposed to move past said insertion station along an axis crosswise to the direction of the movement of the strips and into the gap between said strips; said article carrying means when moving into the gap bringing the article to be compartmentized and stored to the insertion station; means disposed at said station to remove the article from the article carrying means and temporarily retain the article at said station; means causing the guide means to close the gap thereby causing a portion of the article to become retained by said strips, and means advancing said pair of strips while the guide means maintains the gap closed thereby retaining and compartmentizing the article between said strips and moving the article from said insertion station.

6. Apparatus for compartmentizing and storing a plurality of articles for deposit comprising: an article insertion station; material conveying means conveying a pair of strips past said article insertion station; guide means mounted for reciprocatory motion disposed at said station and engaging one of said strips; means actuating the guide means to cyclically move the engaged strip toward and away from the other strip thereby cyclically opening and closing a gap between said strips; article carrying means disposed to move past said insertion station along an axis crosswise to the direction of the movement of the strips; said article carrying means when moving bringing successively the articles to be compartmentized and stored to the insertion station when the reciprocating guide means is moved to a position at which there exists said gap; means disposed at said station to remove sequentially the articles from the article carrying means and causing the articles to be supported in stacked relation; means causing the guide means to close the gap thereby causing a portion of the stacked articles to become retained between said strips, and means advancing said pair of strips while the guide means maintains the gap closed thereby retaining and compartmentizing the articles between said strips and simultaneously moving the articles from said insertion station.

7. Apparatus for compartmentizing and storing a plurality of articles for deposit comprising: an article insertion station; material conveying means conveying a pair of opposing strips past said article insertion station; guide means disposed at said station and engaging one of said strips; means actuating the guide means to cyclically move the engaged strip toward and away from the opposing strip thereby cyclically opening and closing a gap between said strips; article carrying means disposed to move cyclically along an axis crosswise to the direction of the movement of the strips past said insertion station and moving also into the gap between said strips; said article carrying means when moving into the gap successively bringing each of the articles to be compartmentized and stored to the insertion station; means disposed at said station to remove sequentially each of the articles from the article carrying means and causing the articles to be supported in stacked relation and temporarily held stationary; means causing the guide means to close the gap thereby causing a portion of the stacked articles to become retained between said strips, and means advancing said pair of strips while the guide means maintains the gap closed thereby retaining and compartmentizing the articles between said strips and moving the articles from said insertion station.

8. Apparatus for compartmentizing and storing a plurality of articles for deposit comprising: an article insertion station; material conveying means conveying a pair of flexible strips past said article insertion station; guide means disposed at said station and engaging one of said strips; means actuating the guide means to cyclically move the engaged strip toward and away from the other strip thereby cyclically opening and closing a gap between said strips; article carrying means which include a plurality of pockets disposed to move cyclically along an axis crosswise to the direction of the movement of the strips past said insertion station and moving also into the gap between said strips; said article carrying means when cyclically moving into the gap successively bringing each of the articles to be compartmentized and stored to the insertion station; stationary means disposed at said station to remove sequentially each of the articles from the pockets and causing the articles to be supported in stacked relation and temporarily held stationary; means causing the guide means to close the gap thereby causing a portion of the stacked articles to become retained between said strips, and means advancing said pair of strips while the guide means maintains the gap closed thereby frictionally retaining and compartmentizing the articles between said strips and moving the articles from said insertion station.

9. Apparatus for compartmentizing and storing a plurality of articles for deposit as set forth in claim 7 wherein said article carrying means move through the gap between said strips.

10. Apparatus for compartmentizing and storing a plurality of articles for deposit as set forth in claim 7 wherein the strips move in substantially horizontal direction past the article insertion station while the article carrying means move in substantially vertical direction into said insertion station.

11. Method for compartmentizing and storing a plurality of individual articles in the form of a unitary deposit comprising the steps of feeding a set of strips in spaced relation to an article insertion station, feeding individual articles to become compartmentized sequentially to the article insertion station and into the space between the spaced strips, sequentially collecting the individual articles at said station and bringing each article in stacked relation with respect to its preceding article, closing the space between the strips whereby the plurality of articles becomes compartmentized and retained in stacked relation between the strips, and moving the strips holding the plurality of stacked and compartmentized articles from the insertion station.

12. Method for compartmentizing and storing a plurality of individual articles in the form of a unitary deposit comprising the steps of feeding intermittently a set of strips in spaced relation to an article insertion station, feeding individual articles to become compartmentized sequentially to the article insertion station and into the space between the spaced strips, sequentially collecting the individually arriving articles at said station and concurrently bringing each collected article in stacked relation with respect to its preceding article, closing the space between the strips whereby the plurality of articles becomes compartmentized and retained in stacked relation between the strips, and moving the strips holding the plurality of stacked and compartmentized articles from the insertion station.

13. Method for compartmentizing and storing a plurality of individual articles in the form of a unitary deposit comprising the steps of feeding intermittently a set of strips in spaced relation to an article insertion station, feeding individual articles to become compartmentized sequentially to the article insertion station and into the space between the spaced strips, collecting the individually arriving articles at said station and causing each article to become stacked with respect to its preceding article, temporarily retaining the collected and stacked articles stationary while closing the space between the strips whereby the plurality of articles becomes compartmentized and retained in stacked relation between the strips, and moving the strips frictionally holding the plurality of stacked and compartmentized articles from the insertion station.

References Cited in the file of this patent

UNITED STATES PATENTS

| | | |
|---|---|---|
| 2,016,255 | O'Keefe | Oct. 1, 1935 |
| 2,194,451 | Soubier | Mar. 19, 1940 |
| 2,280,573 | Flaws | Apr. 21, 1942 |
| 2,298,363 | Ganz | Oct. 13, 1942 |
| 2,372,072 | Flaws | Mar. 20, 1945 |
| 2,438,089 | Carson | Mar. 16, 1948 |
| 2,563,071 | Salfisberg | Aug. 7, 1951 |
| 2,737,764 | Lewis | Mar. 13, 1956 |